United States Patent
Hellwege et al.

(10) Patent No.: US 11,853,165 B2
(45) Date of Patent: Dec. 26, 2023

(54) USING FILE SYSTEM EXTENDED ATTRIBUTES TO UPDATE DATABASES IN HIERARCHICAL FILE SYSTEMS

(71) Applicant: Western Digital Technologies, Inc., San Jose, CA (US)

(72) Inventors: Stephen Allen Hellwege, Ladera Ranch, CA (US); Sailesh Rachabathuni, Santa Clara, CA (US); Samuel Kevin Baughman, Anaheim, CA (US); Gabriel Ribeiro, San Francisco, CA (US); Jonathan Gaillard, San Francisco, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 452 days.

(21) Appl. No.: 16/775,023

(22) Filed: Jan. 28, 2020

(65) Prior Publication Data
US 2020/0264955 A1 Aug. 20, 2020

Related U.S. Application Data

(63) Continuation of application No. 15/690,114, filed on Aug. 29, 2017, now Pat. No. 10,545,829.

(51) Int. Cl.
*G06F 11/14* (2006.01)
*G06F 16/182* (2019.01)
*G06F 16/27* (2019.01)
*G06F 16/28* (2019.01)

(52) U.S. Cl.
CPC ...... *G06F 11/1435* (2013.01); *G06F 11/1471* (2013.01); *G06F 16/1824* (2019.01); *G06F 16/27* (2019.01); *G06F 16/289* (2019.01)

(58) Field of Classification Search
CPC ............ G06F 11/1435; G06F 11/1471; G06F 16/1824; G06F 16/27; G06F 16/289
See application file for complete search history.

(56) References Cited

U.S. PATENT DOCUMENTS 9,517,402 B1 * 12/2016 Vogel ..................... A63F 13/75
2008/0215528 A1 * 9/2008 Sedlar ................. G06F 16/176

* cited by examiner

*Primary Examiner* — Hosain T Alam
*Assistant Examiner* — Chongsuh Park
(74) *Attorney, Agent, or Firm* — Chang & Hale LLP

(57) ABSTRACT

Systems and methods are disclosed for reconstructing a file hierarchy by scanning attributes of stored files. Stored files can have a file hierarchy that is maintained in a database stored on a storage device. The files can be stored as objects on the device using a flat file structure. The file database provides the file hierarchy. The systems and methods disclosed herein store information in file system extended attributes for individual storage files such that the database can be reconstructed by scanning the storage files, using values in the extended attributes to recreate the hierarchical database.

20 Claims, 4 Drawing Sheets

USING FILE SYSTEM EXTENDED ATTRIBUTES TO UPDATE DATABASES IN HIERARCHICAL FILE SYSTEMS

CROSS-REFERENCE TO RELATED APPLICATION(S)

This application is a continuation of U.S. application Ser. No. 15/690,114 filed Aug. 29, 2017 and entitled "USING FILE SYSTEM EXTENDED ATTRIBUTES TO RECOVER DATABASES IN HIERARCHICAL FILE SYSTEMS," which is incorporated by reference herein in its entirety for all purposes.

BACKGROUND

Field

This disclosure relates to data storage systems. More particularly, the disclosure relates to systems and methods for recreating a database for a hierarchical file system implemented in an object-based storage system.

Description of Related Art

Network-attached storage devices provide access to data over computer networks. The devices may store files using object-based storage. A database can be used to store information so that the object-based storage is represented as a hierarchical file system. This can allow users to browse and interact with the files on the network-attached storage devices using a familiar hierarchical file system structure.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
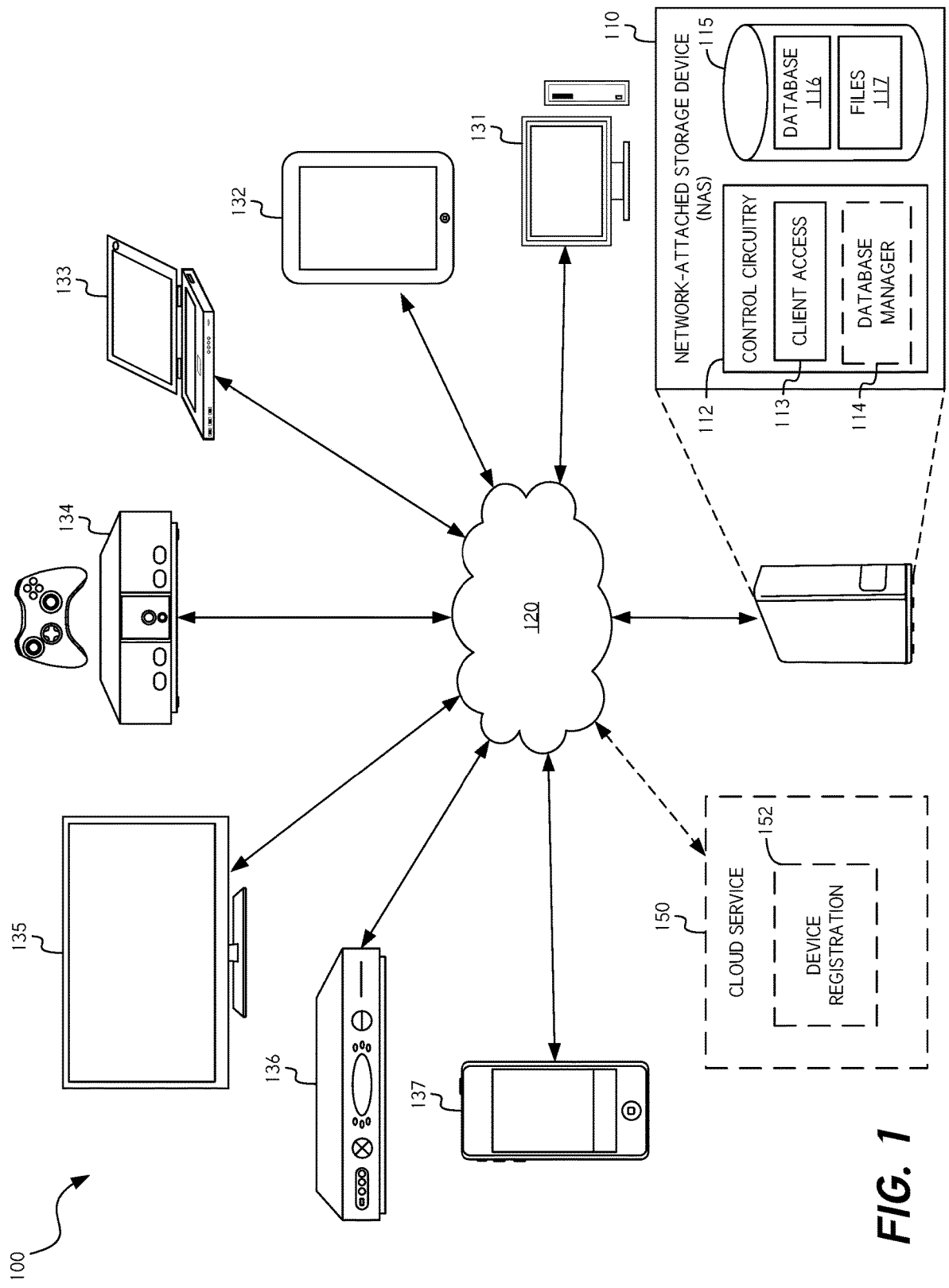
FIG. 1 is a diagram of a networked data storage system in accordance with one or more embodiments.

While certain embodiments are described, these embodiments are presented by way of example only, and are not intended to limit the scope of protection. Indeed, the methods and systems described herein may be embodied in a variety of other forms. Furthermore, various omissions, substitutions and changes in the form of the methods and systems described herein may be made without departing from the scope of protection.

Overview

Various storage server systems allow for host data to be transferred between a host or client and one or more data storage devices. For example, raw data may be written to an object storage device (OSD) of the system, wherein the data is stored as an object on the device. To provide a hierarchical file structure to the client, a database can be created that records the file hierarchy. Although the files are stored on the device in a flat file structure as objects, the use of the local database allows the device to represent the files in a hierarchical file system.

The device can be configured to protect the file system database against power loss or partial data loss. However, a larger scale loss of the database storage area or a software coding error could render the underlying storage unusable even where the content of the stored files remains intact. In such instances, systems and methods that recover files from a damaged file system are not sufficient for recreating the file hierarchy.

Accordingly, described herein are embodiments that reconstruct the file hierarchy by scanning the stored files. In the disclosed embodiments, stored files are not stored in a hierarchical format but rather the file hierarchy is maintained in a database stored on the object storage device (e.g., a network-attached storage device). The files are stored as objects on the device using a flat file structure and the file database provides the file hierarchy. The embodiments described herein include storing information in file system extended attributes for individual storage files such that the database can be reconstructed by scanning the storage files and using values in the extended attributes to recreate the hierarchical database.

The embodiments described herein are presented in the context of network-attached storage servers. This is done merely for the ease of description. It is to be understood, however, that the systems and methods described herein may be applicable to any file storage system that stores files as objects in a flat file structure and uses a database to maintain a file hierarchy. It should also be understood that file system extended attributes in an object-based storage system can be used to store data that serves as a backup for data stored in a database. Thus, if the database becomes corrupted, the files can be scanned and the data stored in the extended attributes can be used to modify, to recreate, or to fix the corrupted database. As used herein, a flat file structure is used to include, but is not limited to, file storage where many or all files are stored at the same level of hierarchy rather than being structured in a folder hierarchy. A flat file structure can include a file system with folders that include a plurality of files in each folder but where the organization into folders does not correspond to a user-created or client-created folder hierarchy. In some embodiments, such a flat file structure may be used to facilitate data access and/or searching.

Network-Attached Storage

Network-attached storage (NAS) drives/systems can provide object-level data storage over a computer network, wherein access to the stored data is accessible to one or more clients. The files can be represented using a hierarchical format although the files are stored as objects on the NAS. The file hierarchy can be stored in a database that the NAS uses to represent the organization of the files to a client.

A NAS may include hardware, software, or a combination of such elements, configured such that the NAS operates as a file server. FIG. 1 is a diagram of an example embodiment of a NAS system 100, in which a network-attached storage device (NAS) 110 is communicatively coupled to one or more client devices 131-137 over a network 120. The NAS 110 may provide object-based data storage services to client devices coupled to the network 120. Types of client devices that may have access to the NAS 110 can include phones 137

(such as smartphones), cable set-top boxes 136, smart TV's 135, video game consoles 134, laptop computers 133, tablet computers 132, desktop computers 131, wearable computers (not shown) and/or other network-connected computing devices. The network 120 may be a local area network (LAN), a wide area network (WAN) (e.g., the Internet), a combination of a LAN and a WAN, or other type of computer network, and the connections between the various client components of the system 100 and the network 120 may be either wired or wireless and may connect through one or more intermediate systems which are not shown for clarity purposes.

While certain embodiments are described herein in the context of NAS devices/systems, it should be understood that references herein to a NAS device may refer to other types of data storage devices/systems, such as any type of computer device implementing software allowing for data storage access. Access to the files can be provided locally (e.g., as an internal or external hard drive) or it can be provided over a network. Furthermore, some embodiments disclosed here may be implemented using data storage device connections that are not over a network, but rather use a direct client/server connection.

In certain embodiments, the NAS 110 may be configurable over the network 120 by a client device interface, such as a web browser of a mobile or desktop computing device. An operating system (e.g., a relatively low-level operating system, such as FreeNAS) may be implemented in the NAS 110 by a control circuitry 112 thereof. The NAS 110 may provide access to files 117 using one or more network file-sharing protocols, such as network file system (NFS), server message block/common internet file system (SMB/CIFS), Apple filing protocol (AFP), or the like. The NAS 110 may comprise a data store 115 for storing a database 116 that provides a file hierarchy, user data (e.g., files) 117 that includes metadata, such as system tables or the like, and/or other types of data. The data store 115 may include one or more non-volatile memory devices or modules, and may include any type of data storage media (e.g., solid-state, magnetic).

The NAS 110 may be configured to implement encryption for user data/files 117 stored in the data store 115. For example, the NAS 110 may implement Transport Layer Security (TLS), Secure Sockets Layer (SSL), and/or Advanced Encryption Standard (AES) keys (e.g., 256-bit, 128-bit, etc.) to protect files in rest and/or in motion. The NAS 110 may further be configured to implement one or more additional security features, such as user verification, forward secrecy, and/or the like.

As referenced above, the NAS 110 can provide shared access to files/data 117 stored on the NAS 110. For example, any of a plurality of clients may request, over the network 120, access to a file. Access to the NAS 110 can be regulated by a cloud service 150. The cloud service 150 can receive attachment requests from one or more clients 131-137 to connect to the NAS 110. If a client is verified, the cloud service 150 grants the client access to the NAS 110. This can be managed by the cloud service 150 using a device registration module 152 that manages attachment between clients and NAS devices.

The NAS 110 restricts access to files based on attachment and permissions managed by the cloud service 150. Once a client is permitted to access files, the NAS 110 manages client interactions using a client access manager 113. The NAS 110 is configured to implement the client access manager 113 using software, firmware, hardware, and/or any combination of these. The client access manager 113 receives file requests and presents one or more files stored in the data store 115, provides information about the requested files, and/or presents the file system structure to the requesting client.

The NAS 110 is also configured to implement a database manager 114. The NAS 110 is configured to implement the database manager 114 using software, firmware, hardware, and/or any combination of these. The database manager 114 is configured to retrieve file information from the database 116 in response to requests from any of the attached clients 131-137. The file information includes information associated with the relationships between files including the hierarchical file system structure.

If the database 116 becomes corrupted, the NAS 110 is configured to recreate or to correct the database 116 using the database manager 114. The database manager 114 is configured to scan the files 117, to extract information from extended attributes of the files 117, and to recreate or to correct the database 116 based on that extracted information. Advantageously, this allows the NAS 110 to protect against failures that corrupt or destroy the database 116 by using data stored with the files 117 (e.g., which can be stored as objects on the data store 115).

Example Data Storage Server

Figure 2:
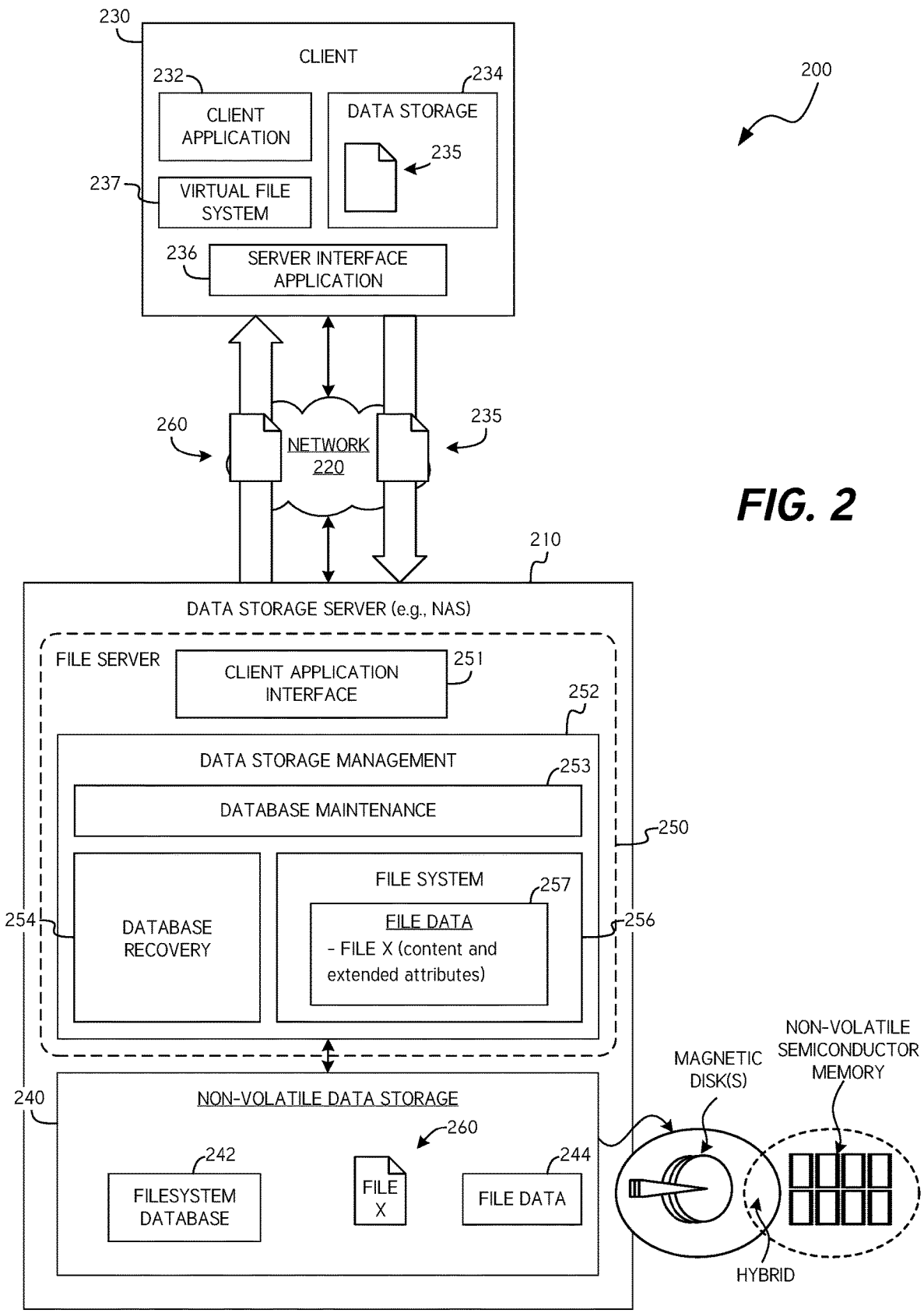
FIG. 2 is a diagram of a data storage server in accordance with one or more embodiments.

FIG. 2 is a block diagram illustrating an example system 200 that includes a data storage server 210, such as a network-attached storage device (NAS), and a client 230. The data storage server 210 may represent an embodiment of the NAS 110 of FIG. 1. Although the storage server 210 may represent any type of data storage server device or system, the storage server 210 may be described below in certain contexts as a NAS for illustration purposes.

Referring to FIG. 2, the data storage server (e.g., NAS) 210 may include certain control circuitry or components configured to implement a file or object server. For example, the illustrated embodiment of FIG. 2 comprises control circuitry functional modules and components including a file server 250, client application interface 251, data storage management module 252, database maintenance 253, database recovery 254, file system 256, and file data 257 (including file content and file system extended attributes). Although the control circuitry of the data storage server 210 is illustrated as various separate modules, it should be understood that the functionality represented thereby may be implemented using any configuration of modules or control circuitry. Although the principles disclosed herein are applicable to an object server, the description below is presented in the context of a file server for illustration purposes.

The data storage server 210 includes non-volatile memory data storage 240. The data storage 240 may comprise one or more disks, wherein the NAS 210 further comprises one or more heads (not shown) actuated radially over the disk(s), and a spindle motor for rotating the disk(s). Alternatively, or in addition, to magnetic (or optical) rotating media, the non-volatile data storage 240 may comprise solid-state memory and/or other non-volatile memory, such as magnetoresistive random access memory (MRAM) and/or phase change memory, or the like. In certain embodiments, the data storage 240 may comprise one or more hybrid hard drives including both magnetic media and solid-state media. In addition to the illustrated modules and components, the data storage server 210 may further include one or more additional network interfaces, processors, data and/or power communication buses, memories, boards, chips/dies, or the like. The non-volatile data storage 240 and a network interface (not shown) are coupled to the control circuitry. Although the control circuitry is illustrated as separate modules, it should be understood that the functionality represented thereby may be implemented using any configuration of modules or control circuitry.

In some embodiments, the non-volatile data storage 240 includes computer executable instructions configured to execute one or more methods or processes (or portions of such processes and methods) described herein. In certain embodiments, the control circuitry is configured to execute computer executable instructions stored on the NAS 210, the computer executable instructions configured to perform one or more of the processes or methods (or portions of such processes and methods) described herein.

The non-volatile data storage 240 stores a file system database 242 that includes records for individual files. The records can be stored in one or more tables in the database 242. The records can include file details, file permissions, privacy details, security information, and the like. In some embodiments, the database 242 is implemented as a structured query language (e.g., SQL) database, but any suitable database implementation may be used. The database 242 can include a content field that points to the file content (e.g., file data 244) in the non-volatile data storage 240.

The non-volatile data storage 240 stores files 260 in a flat structure as objects. Individual files 260 include file data 244 comprising the content of the file (e.g., the data itself), metadata (e.g., data about the file), and a globally unique identifier (e.g., an address given to the object so it can be found on a distributed system). In some embodiments, the non-volatile data storage 240 may break files up into objects for storing, and put the objects back together to recreate the files. Although certain embodiments are described herein in the context of "objects," it should be understood that "objects," as used herein, may refer to any sub-segment of data, such as pieces, shards, blocks, blobs, and the like, and may refer to sub-segments having any desirable size.

The object storage file system 256 may operate according to any desirable storage platform that provides object, block, and/or file storage. For example, the data storage server 210 may implement Ceph, Hadoop, Swift, or other type of object storage management software system. The data storage server 210, when servicing a data storage access command, may provide data to the client 230 as one or more objects (e.g., file 262) or receive data from the client 230 as one or more objects (e.g., file 235). In some embodiments, the data storage server 210 is configured to assemble one or more objects into a file to send to the client 230 (e.g., file 262). In various implementations, the data storage server 210 is configured to receive a file from the client 230 (e.g., file 235) and to convert the file into one or more objects to be stored in the file system 256 on the non-volatile data storage 240 (e.g., as a file object 260).

The file data 244 includes metadata that can be stored as attributes of the file itself. The file system 256 can be configured to store extended file attributes for individual files or objects. The extended file attributes can be name and value textual pairs that are associated with the file or object. Extended attributes provide for additional properties to be stored for files in addition to any standard file system attributes. Extended attributes may be beneficial where it is desirable to store file metadata but it is undesirable, impractical, or impossible to store the metadata using the file internal properties. In some embodiments, the extended attributes include metadata not interpreted by the file system 256 in contrast to regular attributes that have a purpose defined by the file system 256.

By way of example, and without limitation, the following metadata can be stored using file system extended attributes: ContentID, Parent ContentID, Original Name, and IsDirectory. ContentID can be used to refer to the name of the file in the data storage or the actual name of the file on the storage system. Parent ContentID can be used to refer to a parent file of the current file to represent a file hierarchy. Original Name can be used to refer to the original name of the file, or the name of the file presented to a client or user. IsDirectory can be used as a flag indicating whether the file content is a directory or a file.

The database maintenance module 253 can be configured to generate and update the file system database 242. The database maintenance module 253 can be configured to monitor the use of files (e.g., by the client 230) and to update the file system database 242 if changes occur to any files (e.g., upon the creation of a file or when a file is updated or modified). In some embodiments, the database maintenance module 253 is configured to monitor the status of the file system database 242. If the database maintenance module 253 detects that the file system database 242 is corrupt, the database maintenance module 253 can be configured to call the database recovery module 254 to recreate, to correct, or to recover the corrupted database 242. As used herein, the file system database 242 may be corrupted where a portion of the non-volatile data storage 240 that stores the database 242 is damaged, where a program injects incorrect data into the database 242, or where the database 242 includes data that is inconsistent with the file data 257 on the file system 256.

The database recovery module 254 is configured to correct, to recreate, and/or to recover the file system database 242 upon corruption of the database 242. The database recovery module 254 is configured to scan the file system 256 to extract data from the file data 257. In particular, the database recovery module 254 scans the files in non-volatile data storage to extract stored extended attributes. Based on the values in the extracted extended attributes, the database recovery module 254 corrects one or more entries in the file system database 242. In some implementations, the database recovery module 254 generates a new file system database 242 rather than updating the existing file system database 242. This may be advantageous where a portion of the non-volatile data storage 240 is malfunctioning or otherwise broken.

The client 230 may comprise control circuitry configured to implement the functionality of the illustrated modules/components thereof. The client 230 is configured to implement a virtual file system 237. The virtual file system implemented by the client 230 may be configured to retranslate data storage access requests from the client application 232 (e.g., word processor application) to be directed to the data storage server 210. The virtual file system 237 may send requests, as translated by the server interface applications 236 for communication according to the relevant application programming interface (API), via the network 220 to the data storage server 210. The responses from the data storage server 210 may be translated by the server interface application 236 according to the API, passed to the virtual file system 237, and further passed to the client application 232. Storage access commands communicated by the server interface application 236 may include write and read commands issued by the virtual file system 237. The storage access commands may specify a logical block address (LBA), or range of LBAs, according to the file system 256, and the file server 250 may execute the received storage access commands in the non-volatile data storage 240. The file server 250 may be comprised of control circuitry configured to perform the functionality of the various modules/components associated therewith.

In some embodiments, the connection between the client 230 and the data storage server 210 may be wired, such as through Ethernet, universal serial bus (USB), or other connection, or may be wireless, such as through WiFi, Bluetooth, or other wireless connection. In certain embodiments, the connection between the client 230 and the data storage server 210 is achieved over the Internet, wherein each of the client 230 and the data storage server 210 is connected to the Internet over a wired or wireless connection.

The data storage server 210 may be configured to implement data redundancy, wherein copies or portions of user data stored in the data storage 240 are maintained in one or more internal and/or external drives. For example, the data storage server 210 may implement redundant array of independent disks (RAID) technology, wherein the non-volatile memory array 240 includes a plurality of internal drives, disks, or other data storage partitions combined into a logical unit for the purposes of data redundancy and performance improvement. In addition, or alternatively, the data storage server 210 may be configured to implement RAID using one or more internal memory modules in combination with one or more external memory devices. Furthermore, data may be distributed across the RAID memory modules/drives according to any desirable or practical RAID level, depending on the level of redundancy and/or performance desired. For example, the data storage server 210 may be configured to implement RAID 0, RAID 1, RAID 5, RAID 10, or other RAID technology, depending on data reliability, availability, performance and/or capacity considerations or requirements.

The data storage server 210 may implement a file system 256 that may be accessible by the client 230 through the server interface application 236 for browsing and/or searching. For example, the non-volatile data storage 240 may comprise some number of fixed-size data segments of data storage (e.g., blocks). The non-volatile data storage 240 may be configured to process relatively simple data access commands, wherein such commands are received from the file server 250 over a communication interface (e.g., Integrated Drive Electronics (IDE), Small Computer System Interface (SCSI), Serial ATA (SATA), or the like). The file system 256 may implement files, file directories, and/or other data structures that represent data stored in the non-volatile data storage 240. The file system 256 can maintains certain metadata (e.g., tables) for associating logical files with physical block numbers, or the like, in the file system database 242. The file system 256 may process data storage access requests from the client 230 via the client application interface 251 to access logical files, and may use the file system database 242 to locate the associated physical location in the data storage 240. The file system 256 may further maintain a file cache, which is used to buffer data written to, and/or read from, files of the file system. The file cache may be implemented using volatile memory. The file data 257 may be maintained in the non-volatile data storage 240, and may be uploaded to volatile memory for use by the file system 250 and flushed (e.g., periodically) to allow for recreation of the file data after a power cycle.

The data and/or requests communicated between the client 230 and the data storage server 210 over the network 220 may be implemented through a particular communication protocol that both the server interface application 236 of the client 230 and the client application interface 251 of the data storage server 210 are designed to execute. For example, in an embodiment, the client 230 and data storage server 210 communicate according to a representational state transfer (REST) application programming interface (API), or other stateless interface, which may provide desirable interoperability between the system components over the network 220. The implemented API may allow for clients to utilize the file system 256 of the data storage server 210 by requesting files as network resources identified by, for example, a network address (e.g., Uniform Resource Locator (URL), Uniform Resource Identifier (URI), or the like). The requests communicated by the client 230 to the data storage server 210 may comprise, for example, hypertext transfer protocol (HTTP) requests (e.g., HTTP 1.1, HTTP/2).

The client 230 may comprise a server, a desktop, a laptop, a tablet, a handheld device, or the like, and may include control circuitry comprising one or more central processing units (CPUs), memory/data storage devices or modules, network interfaces, and/or input/output interface components, and the like. The control circuitry of the client 230 may be implemented to perform the functionality described herein. The control circuitry of the client 230 may be configured to execute certain software applications for implementing the functionality described herein, such as the client application 232. The application 232 may be executable within an operating system (OS) implemented by the control circuitry of the client 230. The data storage 234 may include one or more local storage devices, such as hard disks, flash memory modules, solid state disks, optical disks, and the like. In certain embodiments, the client 230 comprises a network interface for connecting to the network 220, which may include one or more network adapters (e.g., network interface cards (NICs)).

As described herein, the file server 250 may provide access to resources therein through a representational state transfer (REST) application programming interface (API) implemented by the client application interface 251. Accordingly, the file server 250 may be configured to invoke operations in the data storage server supported by REST API. The client application interface 251 may be configured to implement various API operations (e.g., REST API operations) that can be invoked by the client 230 through communication with the data storage server 210. API operations can include, for example, creation of, and/or access to, files associated with the file system 256, as described herein.

The client 230 may operate as a "client" and data storage server 210 may operate as a "server" in a REST architecture. As is known in the art, REST provides a software architecture for creating scalable web services. In a REST architecture, the functionality of the "client" can be separated from the functionality of the "server." Communication between the client 230 and server 210 may be through the REST API. In general, the client/server techniques described herein can be used in any system having a similar REST architecture having one or more clients (client computing systems) communicating with one or more servers (server computing systems), each server implementing a REST API through which clients can invoke API operations. Each API operation can be any type of service, application, or the like that can be executed by the data storage server 210 on behalf of the client 230.

The file system 256 may be exposed to the client 230 through the client application interface 251. The client 230 may request access to a file (e.g., file X 260), or to generate a new file. In connection with the request, the data storage server 210 may generate a new entry in the file system database 242, may update an existing entry in the file system database 242, and/or may access the file system database 242 to retrieve the file content to be sent to the client 230.

The client application 232 may make certain modifications to the file portion 260, thereby generating a modified file 235. The modified file 235 (or portions thereof) may be uploaded to the data storage server 210 and saved in the non-volatile data storage 240. This may trigger one or more changes in the file system database 242. The database maintenance module 253 can be configured to monitor changes to files or the creation or deletion of files to update the file system database 242.

Database Maintenance and Recovery

Figure 3A:
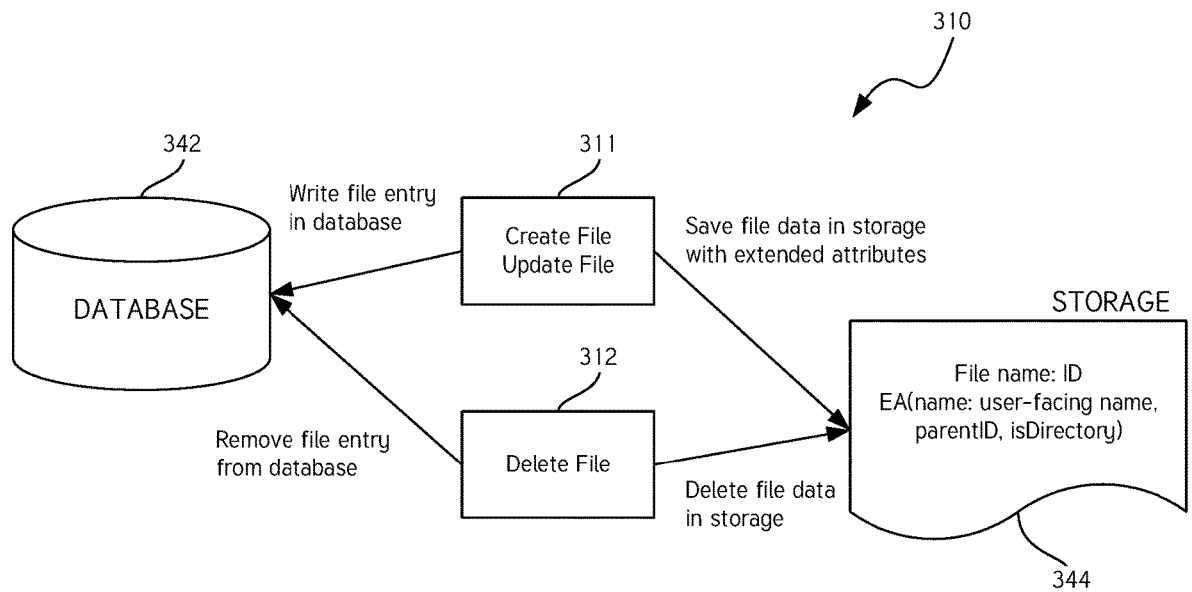
FIG. 3A is a block diagram illustrating maintenance of a file system database.

FIG. 3A is a block diagram illustrating maintenance of a file system database 342. A network-attached storage device 310 can be configured to perform maintenance on the file system database 342 when a file is created, updated, and/or deleted. The NAS device 310 can be the NAS device 110 described herein with reference to FIG. 1 and/or the data storage server 210 described herein with reference to FIG. 2. Similarly, the file system database 342 can be the file system database 242 described herein with reference to FIG. 2 and file data 344 can be the file data 244 described herein with reference to FIG. 2. In particular, the file system database 342 can include records that associate data objects stored in data storage with files and file properties. The file system database 342 can be configured to not include the content of the files, rather the database 342 can be configured to include metadata and other file details about the file. The file data 344 can include information such as the file ID to associate the file data with file information in the database 342 as well as information stored in file system attributes and extended attributes, as described herein. The file data 344 and the database 342 can be stored in non-volatile data storage, as described herein.

When a file is created or updated in block 311 (e.g., by a client), the NAS 310 performs processes on the file data 344 in data storage and the information stored in the database 342. When a new file is created, the NAS 310 writes a new entry in the database 342 associating file properties with the newly created file using, for example, a globally unique identifier. In some embodiments, the globally unique identifier can be used as the file name on the data storage and the database 342 can associate a client-facing file name with the globally unique identifier. Similarly, when a file is updated, the NAS updates the corresponding entry in the database 342.

Moreover, when a file is created or updated in block 311, the NAS 310 saves the updated or new file data 344 in data storage. The NAS 310 also updates or creates new information and writes it to the extended attributes of the file data 344. The extended attributes can include, for example and without limitation, a user-facing name, a parent identifier, a directory flag, and the like. This information can correlate with information that is stored in the database 342. For example, the database 342 can include records with values associated with the user-facing name, the parent identifier, and the directory flag. In this way, the extended attributes of the file data 344 and the records in the database 342 can provide redundant storage of relevant file information.

Furthermore, when a file is deleted in block 312 (e.g., by a client), the NAS 310 can be configured to remove the corresponding entry from the database 342. Similarly, the NAS can be configured to delete the corresponding file data 344 from data storage. In some embodiments, when a file is deleted, the NAS does not remove or overwrite information in the data storage. In some embodiments, when a file is deleted, the NAS does not remove the entry for the file in the database 342. In various implementations, the database 342 includes a field to store a flag indicating whether the file has been deleted.

Figure 3B:
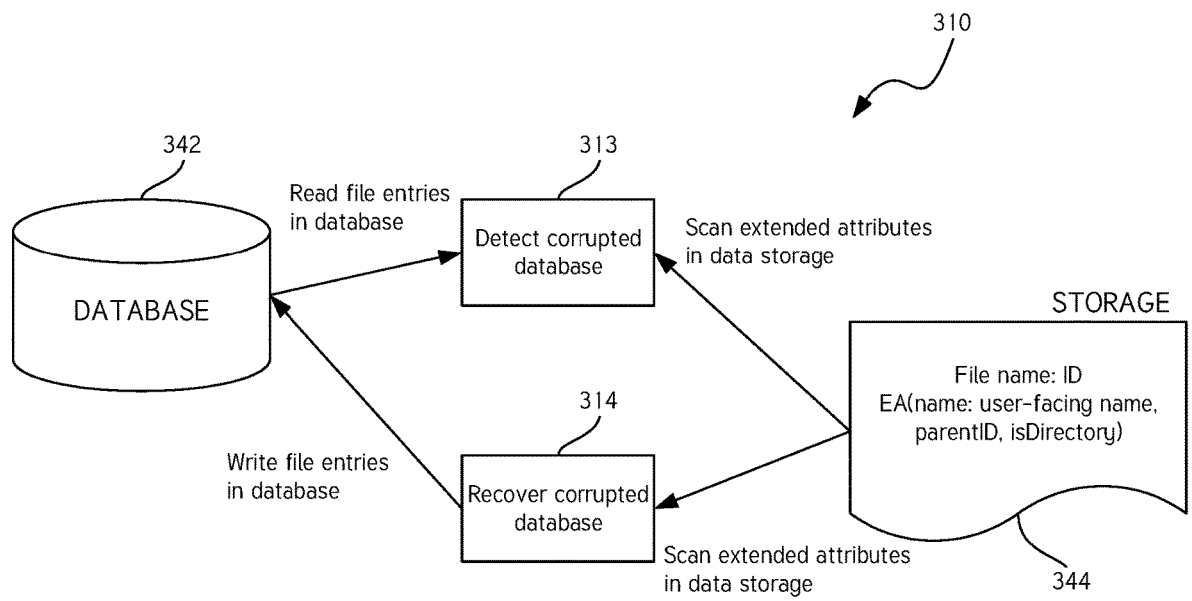
FIG. 3B is a block diagram illustrating recovery of a file system database.

FIG. 3B is a block diagram illustrating recovery of a file system database 342. If the NAS 310 detects that one or more entries in the database 342 is corrupt in block 313, the NAS 310 recovers information for the database 342 using the extended attributes of the file data 344 in block 314. If individual entries in the database are corrupted, the NAS 310 can be configured to identify the corrupted entries and to scan the corresponding objects on the data storage to extract the values stored in the extended attributes. Using the extracted information, the NAS 310 can update individual entries in the database 342. In some embodiments, where the entire database 342 is corrupted, the NAS can be configured to scan all of the file data 344 to extract information from the extended attributes. This information can be used to write new entries in the database 342 or to create a new database 342.

The NAS 310 can be configured to monitor the health of the database 342 in block 313. In some embodiments, the NAS 310 can be configured to determine that the database 342 is corrupt by comparing values stored in the extended attributes of the file data 344 with entries in the database 342. If a discrepancy is detected, the NAS can be configured to initiate a database recovery process 314.

Recovering a File System Database Using Extended Attributes

Figure 4:
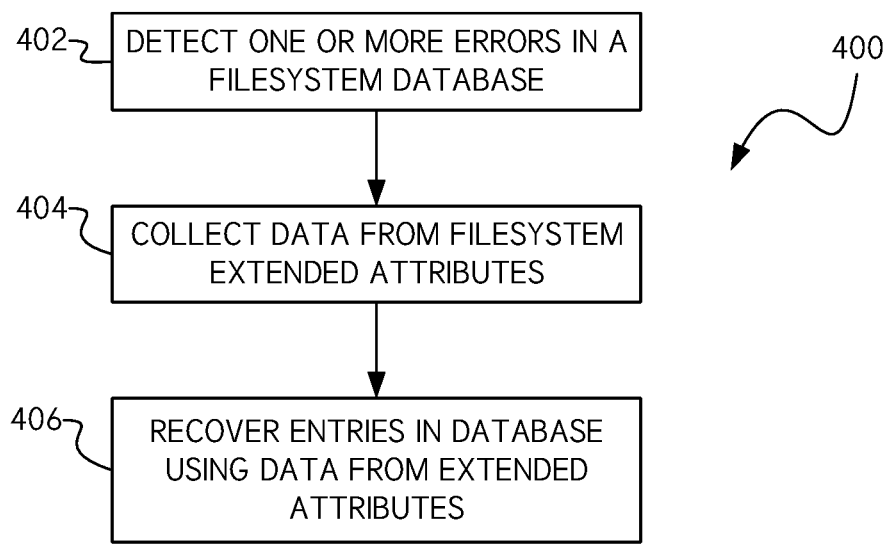
FIG. 4 is a flow diagram illustrating a process for recovering a file system database using file system extended attributes in accordance with one or more embodiments.

FIG. 4 is a flow diagram illustrating a process 400 for recovering a file system database using file system extended attributes in accordance with one or more embodiments. The process 400 may be implemented at least in part by a NAS device. Accordingly, for ease of description, the process 400 is described herein as being performed by the NAS device. The process 400 is configured to recreate or to correct a corrupted file system database by scanning extended attributes stored on the NAS device. This advantageously provides a safeguard against single points of error in certain object-based storage systems where a database is used to record or to establish a file system hierarchy or structure. For example, if a database becomes corrupted while the file data is intact, it is advantageous to recreate the database to provide continued access to the file data.

At block 402, the NAS device detects one or more errors in a file system database. The file system database includes records that associates file metadata and file properties with objects stored in data storage. The file system database can be used to restrict access to files such that any client or application that accesses a file goes through the database to access that file. Accordingly, the NAS device monitors the database to determine that the database is corrupt. Corruption of the database can occur due to hardware failure (e.g., one or more sectors of a hard disk fails) or due to software failure (e.g., a program writes incorrect data to the database or removes one or more entries from the database in error).

At block 404, the NAS device scans through the file system to collect extended attribute data for the objects stored on the file system. The extended attributes can be key value pairs that store additional information about an object or file in addition to the file content and/or any file system attributes.

At block 406, the NAS device updates or creates one or more entries in the file system database using the extracted values from the extended attributes. In some embodiments, the extracted values from the extended attributes can be used to recover a portion of the database. For example, some data may be lost when the database is corrupted and a portion of the corrupted information can be recreated using key value pairs stored in extended attributes of the file system. Other data that is lost in the database, may be recovered or recreated based on file content. For example, information regarding file sharing permissions may be lost while image properties (e.g., image size, date taken, and the like) may be recreated from the file data.

Additional Embodiments

Those skilled in the art will appreciate that in some embodiments, other types of concurrent file modification systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application specific integrated circuit (ASIC) or field programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A network-attached storage device (NAS) comprising:
a non-volatile memory module configured to store:
a plurality of files stored in a flat file structure and not in a hierarchical format, each file in the plurality of files comprising a file content and one or more file system extended attributes that include a parent file identifier that references a parent file of a file, wherein file system extended attributes of the plurality of files are configured to be used to establish a client-facing file hierarchy of the plurality of files; and
a file system database configured to provide the client-facing file hierarchy, the file system database configured to store at least one file system extended attribute including the parent file identifier for each file of the plurality of files but not the file content, wherein the file content of each file of the plurality of files is stored external to the file system database in the flat file structure; and
control circuitry coupled to the non-volatile memory module and configured to:
determine that a new file has been created by a client using the client-facing file hierarchy, the new file including file system extended attributes that include a parent file identifier that references a parent file of the new file;
in response to determining that the new file has been created:
store the new file within the flat file structure on the non-volatile memory module;
scan the new file to extract information to determine the parent file of the new file within the client-facing file hierarchy from the file system extended attributes of the new file; and
write file information to an updated file system database based on the extracted information to include the new file in the updated file system database thereby updating the client-facing file hierarchy of the plurality of files in the file system database to include the new file; and
in response to an update to the parent file of the new file in the client-facing file hierarchy:
update a record in the file system database to reference a second parent file identifier referencing a new parent of the new file in the client-facing file hierarchy; and
store the second parent file identifier in a first extended attribute of the new file within the flat file structure.

2. The NAS of claim 1, wherein the file system database comprises records associating file system extended attributes with one or more stored objects.

3. The NAS of claim 1, wherein individual files of the plurality of files are stored as objects using object-based storage.

4. The NAS of claim 1, wherein the control circuitry is further configured to create a new file system database as the updated file system database.

5. The NAS of claim 1, wherein the control circuitry is further configured to add one or more entries to the file system database to create the updated file system database.

6. The NAS of claim 1, wherein the at least one file system extended attribute further includes key-value pairs corresponding to a file identifier, a client-facing filename, and a flag indicating whether a corresponding file is a directory.

7. The NAS of claim 6, wherein the file identifier corresponds to a name of a file stored in the non-volatile memory module.

8. The NAS of claim 7, wherein the file identifier differs from the client-facing filename.

9. The NAS of claim 1, further comprising a network interface.

10. The NAS of claim 9, wherein the control circuitry is further coupled to the network interface and is further configured to:
receive, from a client device, a request for access to a file;
determine, using the updated file system database, an object stored on the non-volatile memory module corresponding to the file requested by the client device;
send, to the client device, file data corresponding to the file requested by the client device;

receive, from the client device, modifications to the file sent to the client device;

modify the updated file system database with modified properties based on the modifications to the file received from the client device; and modify the file system extended attributes with the modified properties.

11. A network-attached storage device (NAS) comprising:

a non-volatile memory module configured to store:
  a plurality of files stored in a flat file structure and not in a hierarchical format, each file in the plurality of files comprising a file content and one or more file system extended attributes that include a parent file identifier that references a parent file of a file, wherein file system extended attributes of the plurality of files are configured to be used to establish a client-facing file hierarchy of the plurality of files; and
  a file system database configured to provide the client-facing file hierarchy, the file system database configured to store at least one file system extended attribute including the parent file identifier for each file of the plurality of files but not the file content, wherein the file content of each file of the plurality of files is stored external to the file system database in the flat file structure; and control circuitry coupled to the non-volatile memory module and configured to:
  determine that a file has been modified by a client using the client-facing file hierarchy, the modified file including at least one change to file system extended attributes of the file that includes a change of a parent file identifier that references a parent file of the modified file; and
  in response to determining that the file has been modified:
    update the modified file within the flat file structure on the non-volatile memory module, the update comprising at least storing a second parent file identifier in a first extended attribute of the modified file within the flat file structure, the second parent file identifier referencing a new parent file of the modified file;
    scan the modified file to extract information to determine a modified parent file of the modified file within the client-facing file hierarchy from the file system extended attributes of the modified file; and
    write file information to an updated file system database based on the extracted information to change an entry associated with the modified file thereby updating the client-facing file hierarchy of the plurality of files in the file system database to indicate modifications to the modified file.

12. The NAS of claim 11, wherein the file system database comprises records associating file system extended attributes with one or more stored objects.

13. The NAS of claim 11, wherein individual files of the plurality of files are stored as objects using object-based storage.

14. The NAS of claim 11, wherein the control circuitry is further configured to create a new file system database as the updated file system database.

15. The NAS of claim 11, wherein the control circuitry is further configured to remove an entry from the file system database and to add a new entry to the file system database to create the updated file system database.

16. The NAS of claim 11, wherein the control circuitry is further configured to modify an entry in the file system database to create the updated file system database.

17. The NAS of claim 11, wherein the at least one file system extended attribute further includes key-value pairs corresponding to a file identifier, a client-facing filename, and a flag indicating whether a corresponding file is a directory.

18. The NAS of claim 17, wherein the file identifier corresponds to a name of a file stored in the non-volatile memory module.

19. The NAS of claim 18, wherein the file identifier differs from the client-facing filename.

20. A network attached storage (NAS) device comprising:

data storage means for storing:
  computer executable instructions;
  a plurality of files stored in a flat file structure and not in a hierarchical format, each file in the plurality of files comprising a file content and one or more file system extended attributes that include a parent file identifier that references a parent file of a file, wherein file system extended attributes of the plurality of files are configured to be used to establish a client-facing file hierarchy of the plurality of files; and
  a file system database configured to provide the client-facing file hierarchy, the file system database configured to store at least one file system extended attribute including the parent file identifier for each file of the plurality of files but not the file content, wherein the file content of each file of the plurality of files is stored external to the file system database in the flat file structure; and control means for controlling the data storage means and, upon execution of the computer executable instructions, for:
  determining that a new file has been created by a client using the client-facing file hierarchy, the new file including file system extended attributes that include a parent file identifier that references a parent file of the new file;
  in response to determining that the new file has been created:
    storing the new file within the flat file structure of the data storage means;
    scanning the new file to extract information to determine the parent file of the new file within the client-facing file hierarchy from the file system extended attributes of the new file; and
    writing file information to an updated file system database based on the extracted information to include the new file in the updated file system database thereby updating the client-facing file hierarchy of the plurality of files in the file system database to include the new file; and
  in response to an update to the parent file of the new file in the client-facing file hierarchy:
    updating a record in the file system database to reference a second parent file identifier referencing a new parent of the new file in the client-facing file hierarchy; and
    storing the second parent file identifier in a first extended attribute of the new file within the flat file structure.

* * * * *